United States Patent
Guo et al.

(10) Patent No.: US 10,205,648 B1
(45) Date of Patent: Feb. 12, 2019

(54) NETWORK MONITORING USING TRAFFIC MIRRORING AND ENCAPSULATED TUNNEL IN VIRTUALIZED INFORMATION PROCESSING SYSTEM

(71) Applicant: EMC Corporation, Hopkinton, MA (US)

(72) Inventors: Feng Guo, Shanghai (CN); Kai Yan, Shanghai (CN); David Black, Acton, MA (US); Kathleen M. Moriarty, Arlington, MA (US); Lintao Wan, Shanghai (CN); Qiyan Chen, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 691 days.

(21) Appl. No.: 14/292,183

(22) Filed: May 30, 2014

(51) Int. Cl.
*G06F 15/16* (2006.01)
*H04L 12/26* (2006.01)

(52) U.S. Cl.
CPC .................................. *H04L 43/50* (2013.01)

(58) Field of Classification Search
CPC ... H04L 63/20; H04L 63/029; H04L 63/1416; H04L 12/2602; H04L 43/08; H04L 61/103; H04L 67/1095; H04L 47/2441; H04L 67/141; H04L 43/0811; H04L 12/56; H04L 43/12; H04L 43/50; G06F 17/30345
USPC .... 709/224, 223, 225–226, 228, 232; 726/1; 370/392
See application file for complete search history.

(56) References Cited

U.S. PATENT DOCUMENTS

| | | | | |
|---|---|---|---|---|
| 7,899,048 B1 * | 3/2011 | Walker | .................... | H04L 43/18 370/390 |
| 7,940,685 B1 * | 5/2011 | Breslau | ............... | H04L 43/0835 370/251 |
| 8,228,818 B2 * | 7/2012 | Chase | ..................... | H04L 43/12 370/232 |
| 8,346,918 B2 * | 1/2013 | Kay | .................... | H04L 63/1416 709/224 |
| 8,528,091 B2 * | 9/2013 | Bowen | .................. | G06F 21/566 713/168 |
| 8,560,663 B2 * | 10/2013 | Baucke | ................... | H04L 45/50 370/255 |

(Continued)

OTHER PUBLICATIONS

"RSA Netwitness Overview, Network Security Monitoring Platform," webpage including data sheet, http://www.emc.com/security/rsa-netwitness/rsa-netwitness-decoder.htm, Jun. 2014, 6 pages.

(Continued)

*Primary Examiner* — Lance Leonard Barry
(74) *Attorney, Agent, or Firm* — Ryan, Mason & Lewis, LLP (57) ABSTRACT

A request is obtained at a monitoring controller to provide a monitoring function for at least one subject virtual processing element (e.g., VM) in a virtualized information processing system. The monitoring controller selects and/or provisions at least one traffic capture appliance configured to capture traffic associated with the subject virtual processing element. The monitoring controller requests the virtualized information processing system to forward a copy of traffic associated with the subject virtual processing element, using traffic mirroring and an encapsulated tunnel, to the traffic capture appliance for analysis.

20 Claims, 3 Drawing Sheets

(56) References Cited

U.S. PATENT DOCUMENTS

| | | | | |
|---|---|---|---|---|
| 8,645,952 B2* | 2/2014 | Biswas | H04L 49/208 | 718/1 |
| 8,665,747 B2* | 3/2014 | Elsen | H04L 12/462 | 370/254 |
| 8,750,288 B2* | 6/2014 | Nakil | G06N 99/005 | 370/351 |
| 8,800,009 B1* | 8/2014 | Beda, III | H04L 63/0846 | 713/155 |
| 8,811,214 B2* | 8/2014 | Sharma | H04L 12/4641 | 370/252 |
| 8,966,035 B2* | 2/2015 | Casado | H04L 49/00 | 709/223 |
| 8,966,074 B1* | 2/2015 | Richards | H04L 43/08 | 709/224 |
| 9,104,458 B1* | 8/2015 | Brandwine | G06F 9/45558 | |
| 9,288,219 B2* | 3/2016 | Abuelsaad | H04L 63/1408 | |
| 9,384,029 B1* | 7/2016 | Brandwine | G06F 9/5077 | |
| 9,450,817 B1* | 9/2016 | Bahadur | H04L 45/64 | |
| 9,529,689 B2* | 12/2016 | Ferris | G06F 11/3466 | |
| 9,575,781 B1* | 2/2017 | Suit | G06F 9/455 | |
| 2001/0055274 A1* | 12/2001 | Hegge | H04L 43/026 | 370/229 |
| 2002/0075809 A1* | 6/2002 | Phaal | H04L 41/0213 | 370/245 |
| 2005/0015642 A1* | 1/2005 | Hannel | H04L 43/50 | 714/4.2 |
| 2006/0059163 A1* | 3/2006 | Frattura | H04L 12/2602 | |
| 2008/0163333 A1* | 7/2008 | Kasralikar | H04L 63/1408 | 726/1 |
| 2008/0256533 A1* | 10/2008 | Ben-Yehuda | G06F 9/45558 | 718/1 |
| 2008/0267179 A1* | 10/2008 | LaVigne | H04L 12/66 | 370/389 |
| 2009/0290501 A1* | 11/2009 | Levy | H04L 49/70 | 370/250 |
| 2010/0054152 A1* | 3/2010 | Foschiano | H04L 41/0886 | 370/253 |
| 2010/0235836 A1* | 9/2010 | Bratanov | G06F 9/45533 | 718/1 |
| 2011/0035494 A1* | 2/2011 | Pandey | G06F 9/5077 | 709/224 |
| 2012/0039337 A1* | 2/2012 | Jackowski | H04L 47/2441 | 370/392 |
| 2012/0082162 A1* | 4/2012 | Li | G06F 11/2071 | 370/392 |
| 2012/0099602 A1* | 4/2012 | Nagapudi | H04L 12/4633 | 370/401 |
| 2012/0147890 A1* | 6/2012 | Kikuchi | H04L 12/4633 | 370/392 |
| 2012/0159454 A1* | 6/2012 | Barham | G06F 9/45558 | 717/128 |
| 2012/0207177 A1* | 8/2012 | Sharma | H04L 12/4641 | 370/419 |
| 2012/0307684 A1* | 12/2012 | Biswas | H04L 49/208 | 370/254 |
| 2012/0324442 A1* | 12/2012 | Barde | H04L 49/70 | 718/1 |
| 2013/0007740 A1* | 1/2013 | Kikuchi | H04L 41/5012 | 718/1 |
| 2013/0044636 A1* | 2/2013 | Koponen | H04L 47/12 | 370/254 |
| 2013/0111468 A1* | 5/2013 | Davis | G06F 9/5077 | 718/1 |
| 2013/0133068 A1* | 5/2013 | Jiang | G06F 9/45533 | 726/23 |
| 2013/0152076 A1* | 6/2013 | Patel | G06F 9/45558 | 718/1 |
| 2013/0212244 A1* | 8/2013 | Koponen | G06F 9/45558 | 709/223 |
| 2013/0227674 A1* | 8/2013 | Anderson | H04L 63/1441 | 726/15 |
| 2013/0263259 A1* | 10/2013 | Huston, III | H04L 63/1408 | 726/22 |
| 2014/0029451 A1* | 1/2014 | Nguyen | H04L 43/50 | 370/252 |
| 2014/0075013 A1* | 3/2014 | Agrawal | G06F 11/3495 | 709/224 |
| 2014/0149980 A1* | 5/2014 | Vittal | G06F 9/5072 | 718/1 |
| 2014/0204734 A1* | 7/2014 | Mizuno | H04L 49/70 | 370/225 |
| 2014/0229605 A1* | 8/2014 | Besser | H04L 43/12 | 709/224 |
| 2014/0280887 A1* | 9/2014 | Kjendal | H04L 43/12 | 709/224 |
| 2014/0280889 A1* | 9/2014 | Nispel | H04L 43/04 | 709/224 |
| 2014/0351923 A1* | 11/2014 | Madani | H04L 63/029 | 726/14 |
| 2015/0071091 A1* | 3/2015 | Govil | H04L 41/046 | 370/252 |
| 2015/0071292 A1* | 3/2015 | Tripathi | H04L 45/66 | 370/392 |
| 2015/0124622 A1* | 5/2015 | Kovvali | H04W 28/0215 | 370/236 |
| 2015/0124812 A1* | 5/2015 | Agarwal | H04L 45/24 | 370/392 |
| 2015/0127805 A1* | 5/2015 | Htay | H04L 43/0876 | 709/224 |
| 2015/0139232 A1* | 5/2015 | Yalagandula | G06F 9/45558 | 370/392 |
| 2015/0172208 A1* | 6/2015 | DeCusatis | H04L 47/70 | 709/226 |
| 2015/0215195 A1* | 7/2015 | Raps | H04L 45/02 | 370/254 |
| 2015/0244617 A1* | 8/2015 | Nakil | G06F 9/45558 | 709/224 |
| 2015/0281067 A1* | 10/2015 | Wu | H04L 61/103 | 370/392 |
| 2015/0309829 A1* | 10/2015 | Hiltgen | G06F 9/45545 | 718/1 |
| 2015/0312215 A1* | 10/2015 | Kher | H04L 45/30 | 726/11 |
| 2015/0350095 A1* | 12/2015 | Raney | H04L 47/2441 | 709/223 |
| 2016/0034295 A1* | 2/2016 | Cochran | G06F 9/45558 | 718/1 |
| 2016/0044035 A1* | 2/2016 | Huang | H04L 63/0272 | 726/4 |
| 2016/0073278 A1* | 3/2016 | Roessler | H04L 49/70 | 370/252 |
| 2016/0080263 A1* | 3/2016 | Park | G06F 17/30345 | 370/392 |
| 2016/0112488 A1* | 4/2016 | Oksanen | H04L 65/607 | 709/219 |
| 2016/0173326 A1* | 6/2016 | Koehler | H04L 61/1511 | 709/220 |
| 2016/0191568 A1* | 6/2016 | Nispel | H04L 63/20 | 726/1 |
| 2016/0212687 A1* | 7/2016 | Baker | H04L 41/0809 | |
| 2016/0352637 A1* | 12/2016 | Wakumoto | H04L 45/745 | |

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

D. Farinacci et al., "Generic Routing Encapsulation (GRE)," Network Working Group, Request for Comments: 2784, Mar. 2000, 9 pages.

(56) References Cited

OTHER PUBLICATIONS

G. Dommety, "Key and Sequence Number Extensions to GRE," Network Working Group, Request for Comments: 2890, Sep. 2000, 7 pages.

\* cited by examiner

NETWORK MONITORING USING TRAFFIC MIRRORING AND ENCAPSULATED TUNNEL IN VIRTUALIZED INFORMATION PROCESSING SYSTEM

FIELD

The field relates generally to information processing systems, and more particularly to techniques for network monitoring in virtualized information processing systems.

BACKGROUND

One example of an information processing system is a data center. Security is one of the most important aspects of data center operations. In data centers that employ Software Defined Networking (SDN), logical network connectivity among virtual machines (VMs) and other networked resources is relatively dynamic by comparison with the physical network connectivity of the data center. Inevitably, such dynamic logical network connectivity, as well as the implementation of SDN control functionality, create new implementation challenges in network monitoring.

Most existing network monitoring solutions rely on attaching physical monitoring devices to data center network devices in order to inspect traffic. This deployment approach works well in small and mid-sized deployment environments for relatively static monitoring requirements. However, in a large sophisticated data center, deploying and configuring physical monitoring devices for the traffic flows for a large number of network devices are huge operational efforts and consume significant resources.

SUMMARY

Embodiments of the invention provide techniques for network monitoring in a virtualized information processing system.

For example, in one embodiment, a method comprises the following steps. A request is obtained at a monitoring controller to provide a monitoring function for at least one subject virtual processing element (e.g., VM) in a virtualized information processing system. The monitoring controller selects and/or provisions at least one traffic capture appliance configured to capture traffic associated with the subject virtual processing element. The monitoring controller requests the virtualized information processing system to forward a copy of traffic associated with the subject virtual processing element to the traffic capture appliance for analysis. One or more of the steps are performed under control of at least one processing device.

In one example, the monitoring controller requests a system controller of the virtualized information processing system to set up network traffic mirroring and an encapsulation tunnel at one or more logical ports of a virtual switch that corresponds to the subject virtual processing element so as to forward a copy of traffic associated with the subject virtual processing element to the traffic capture appliance.

In another embodiment, an article of manufacture is provided which comprises a processor-readable storage medium having encoded therein executable code of one or more software programs. The one or more software programs when executed by the at least one processing device implement steps of the above-described method.

In yet another embodiment, an apparatus comprises a memory and a processor configured to perform steps of the above-described method.

Advantageously, embodiments described herein provide elastic network monitoring services that provision network monitoring on-demand for a VM, and maintain the service functionality across network environment changes that include, but are not limited to, VM migration.

These and other features and advantages of the present invention will become more readily apparent from the accompanying drawings and the following detailed description.

DETAILED DESCRIPTION

Embodiments of the invention will be described herein with reference to exemplary information processing systems, computing systems, data storage systems, data centers, and associated servers, computers, appliances, controllers, storage units, storage devices, and other processing devices. It is to be appreciated, however, that embodiments of the invention are not restricted to use with the particular illustrative system and device configurations shown. Moreover, the phrases "information processing system," "computing system," "data storage system" and "data centers" as used herein are intended to be broadly construed, so as to encompass, for example, private or public cloud computing or storage systems, as well as other types of systems comprising distributed virtual and/or physical infrastructure. A computing system that implements virtualization is referred to herein as a "virtualized information processing system." However, a given embodiment may more generally comprise any arrangement of one or more processing devices.

As mentioned above, the broad adoption of virtualization technology in data centers results in logical network connectivity that is relatively dynamic by comparison to physical networking infrastructure. This makes it difficult to monitor a subject VM that may migrate inside a data center or even across different data centers.

In a virtualized computing environment, the network traffic between VMs that use a common hypervisor may not be visible to existing physical monitoring solutions. Monitoring of this class of traffic may be essential to achieving comprehensive enterprise security protection and full traffic visibility for network analytics.

With the development of software defined networking and network virtualization, there are virtual network controllers that provide an intelligent abstraction layer between end hosts and the physical network with centralized control to configure and manage virtual networks. An example is the VMware NSX™. In a virtualization environment, the network interfaces in VMs are connected to physical networks via virtual switches. A virtual switch is a network switch implemented by hypervisor-resident software. VMs are attached to logical ports of virtual switches. Open vSwitch (OVS) is an example of virtual switch.

A virtual network controller interacts with virtual switches for configuration purposes via protocols such as OpenFlow™ and the Open vSwitch Database (OVSDB) Management Protocol which is a configuration protocol that is designed to manage Open vSwitch implementations. Some virtual network controllers provide advanced network features, for example, centralized on-demand configuration of network port mirroring and network tunnels. For example, NVP can direct OVS to dynamically mirror all network traffic sent through a logical port, use Generic Routing Encapsulation (GRE) to encapsulate the mirrored traffic, and forward the encapsulated traffic to any destination specifiable by an Internet Protocol (IP) address as a remote GRE tunnel endpoint. A detailed explanation about GRE is provided in two Internet Engineering Task Force (IETF) Request for Comment (RFC) standards, RFC 2784 and RFC 2890. This functionality enables on-demand mirroring, tunnel encapsulation and forwarding of network traffic of a VM that is attached to NVP/OVS-managed virtual networks. Such traffic capture for analysis is not affected by VM migration because the traffic mirroring, encapsulation and forwarding is configured at an abstract layer (logical port on a logical network which is not affected by VM migration). Live VM migration refers to a process of moving a running VM between different physical (host) machines without disconnecting the associated client or application. Memory, storage, and network connectivity of the VM are transferred from the source host machine to the destination host machine, along with the monitoring functionality and local GRE tunnel endpoint. However, illustrative embodiments of the invention can be applied in a straightforward manner to VM migration that is not necessarily "live," i.e, shutdown/move VM.

Embodiments of the invention provide an elastic monitoring service configured to provide on-demand provision network monitoring for a VM and maintain the service functionality across network environment changes that include VM migration. Existing network analytics and security tools can be used on the network traffic captured by this monitoring service.

Figure 1:
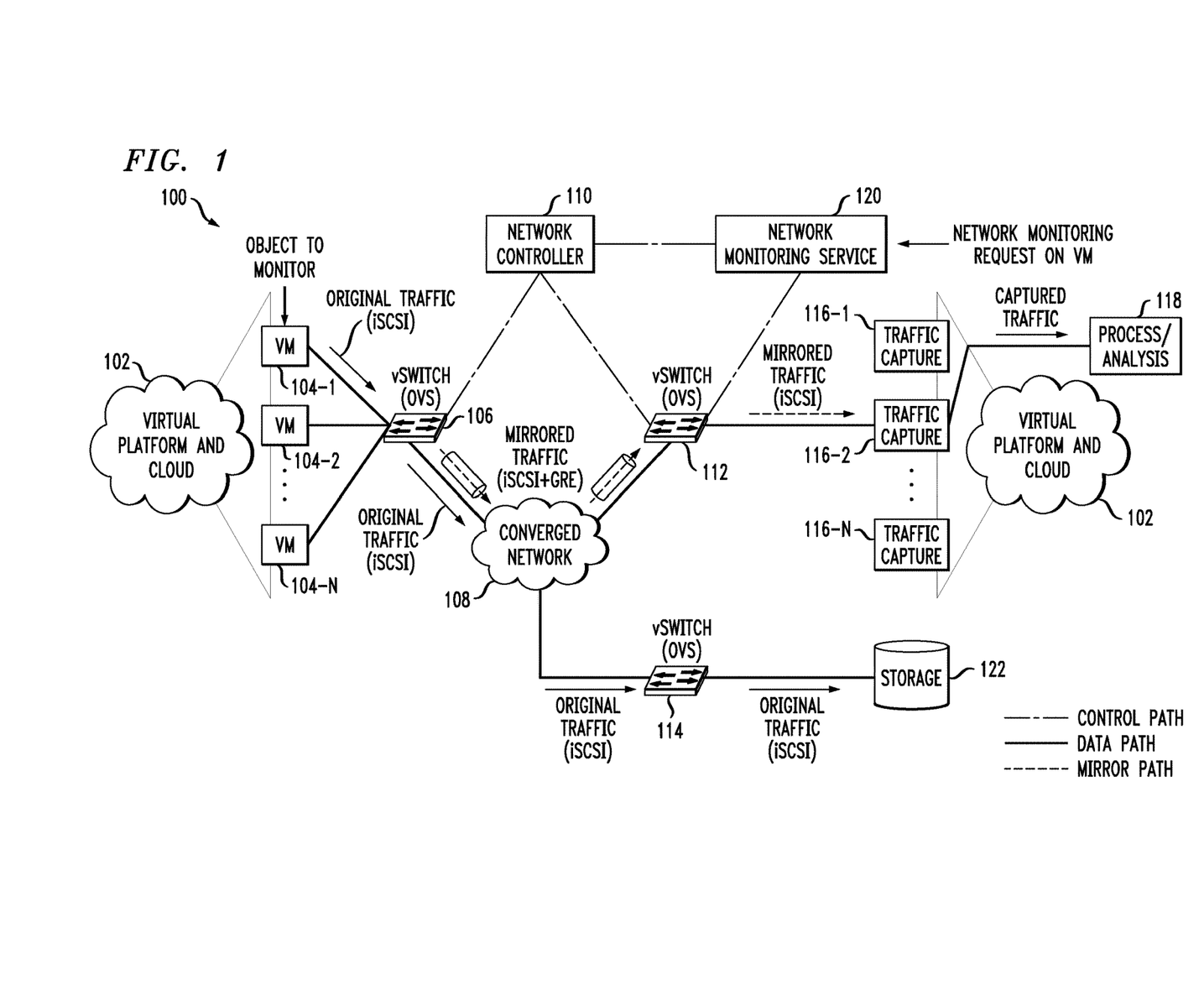
FIG. 1 shows an information processing system within which network monitoring techniques are implemented according to one or more embodiments of the invention.

FIG. 1 shows an information processing system within which improved network monitoring techniques are implemented according to an embodiment of the invention. As shown, an information processing system 100 includes a virtual platform and cloud infrastructure 102 which is in the form of a SDN-enabled data center. Thus, system 100 is a virtualized information processing system. It is to be appreciated that element 102, in an alternate embodiment, can be implemented as a virtual platform without a cloud infrastructure.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. As used herein, a "virtual platform" refers to a computing platform that implements server virtualization. Server virtualization functionality is implemented and realized via a hypervisor. A hypervisor is typically comprised of one or more software programs configured to create and manage virtual assets such as VMs. The hypervisor is directly inserted on top of the computer hardware in order to allocate hardware resources of the physical infrastructure dynamically and transparently. The hypervisor provides, by way of example, the ability for multiple operating systems to run concurrently on a single physical computer and share hardware resources with each other.

By way of example, as shown in FIG. 1, virtual platform and cloud infrastructure 102 comprises VMs 104-1, 104-2, . . . , 104-N. A VM is an example of a "virtual processing element." The VMs are connected to a converged network 108 via a virtual switch 106. As is known, a virtual switch is typically network switch software designed for remote control, and operates in a hypervisor to form a software abstraction layer between VMs and the physical network. VMs attach to logical ports of a virtual switch. OVS (Open vSwitch) is an example of a virtual switch.

The system 100 also includes a network (or system) controller 110. The network controller 110 is configured to interact with virtual switches during runtime for managing switch configuration via protocols such as OpenFlow™ and OVSDB. More generally, the network controller 110 is responsible for managing networking inside and across the SDN-enabled data center, and is thus sometimes referred to as an "SDN controller." In one illustrative embodiment using OpenStack™, Neutron™ is an example of an SDN controller component that manages the logical networking of OpenStack™ and is able to provision and configure virtual networking via plugins such as the NVP plugin. In some scenarios, NVP can also act as an SDN controller in a data center environment on its own.

As further shown in FIG. 1, the network controller 110 also controls virtual switch 112 and virtual switch 114. It is to be appreciated that the system 100 can comprise more virtual switches than those illustratively shown in FIG. 1. Virtual switch 114 couples the converged network 108 with a storage system 122. The storage system 122 can be implemented with one or more data storage products such as, but not limited to, VNX® and Symmetrix VMAX®, both commercially available from EMC Corporation (Hopkinton, Mass.). It is to be appreciated that data flow to a storage system as shown in FIG. 1 is merely an example, i.e., all network traffic of a target VM can be mirrored unless some filtering rule is set up to designate a subset of the network traffic.

As will be further explained below, virtual switch 112 couples the converged network 108 with traffic capture components 116-1, 116-2, . . . , 116-N. A traffic capture component is a virtual appliance or software program installed on a VM that is configured to capture, model and reassemble network traffic that is sent to it for further process and analysis. Such process and analysis is performed by process and analysis module 118. An example of a virtual appliance that can be used to implement a traffic capture component is an RSA® Security Analytics Packet-Decoder which can be dynamically provisioned and configured to perform network packet capturing and network session rebuild. As used herein, a traffic capture component may also be referred to as a "traffic capture appliance."

As further shown in FIG. 1, the system 100 includes a network monitoring controller 120 that contains logic to provide "elastic" network monitoring services by coordinating with other services/components, for example, interacting with the SDN controller 110 to set up traffic mirroring and tunneling, configuring network monitoring products (e.g., RSA® Security Analytics Packet Decoder), as will be further explained in detail below. Elasticity refers to the degree to which a system is able to adapt to workload changes by provisioning and deprovisioning resources in an autonomic manner, such that at each point in time the available resources adequately correspond to the current demand. The network monitoring controller 120 is also configured to provide interfaces that may include, but are not limited to, Representational State Transfer (REST), Command Line Interface (CLI) and Graphical User Interface (GUI) for network monitoring provisioning and configuration functionality.

It is to be appreciated the functionalities of the network controller 110 and the network monitoring controller 120 can be implemented in the same controller component (e.g., an SDN controller), or in separate controller components as illustratively depicted in FIG. 1. Also, such controllers can be implemented as one or more VMs (i.e., virtual processing elements).

Figure 2:
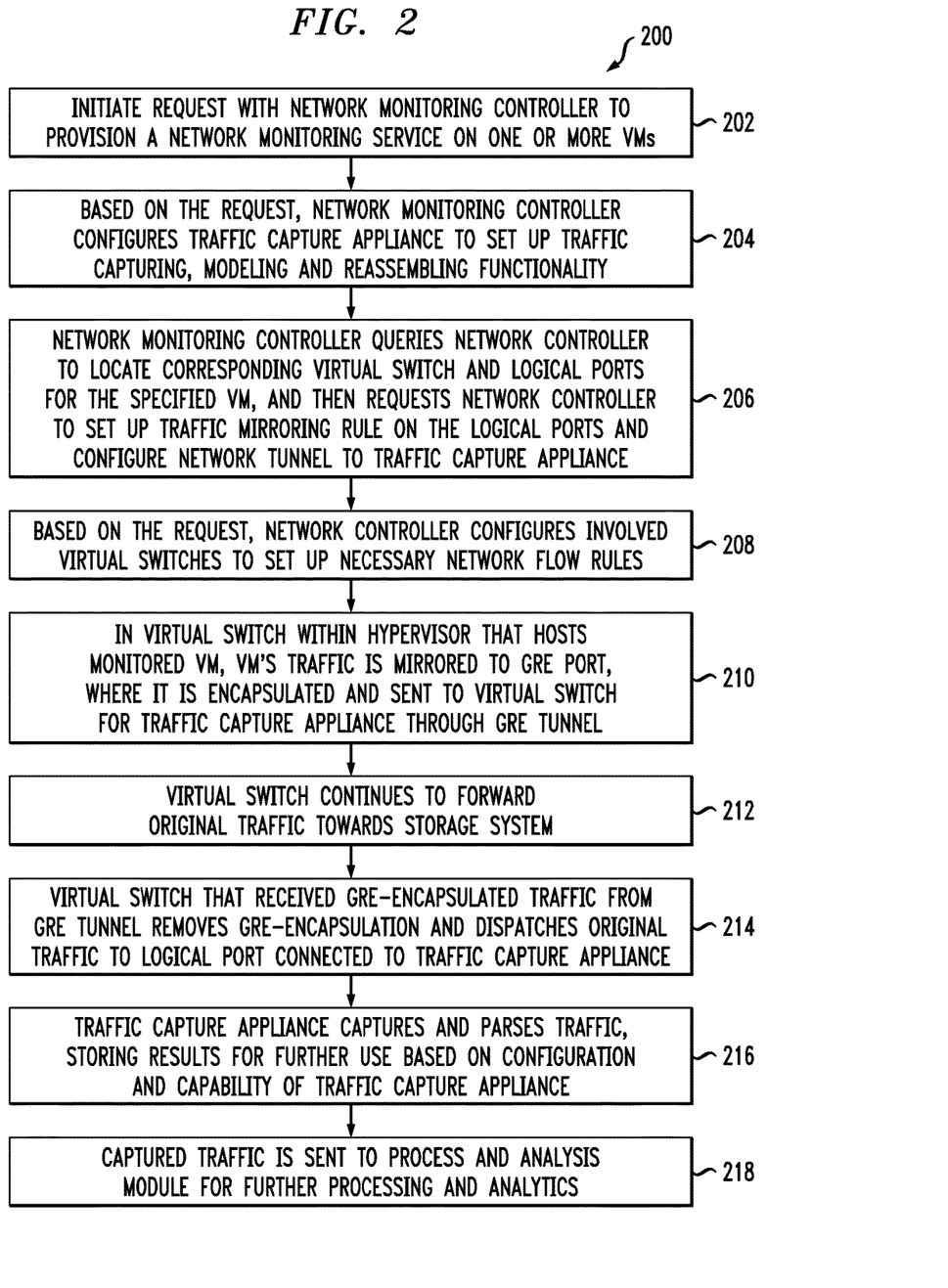
FIG. 2 shows a network monitoring methodology according to one or more embodiments of the invention.

FIG. 2 shows a network monitoring methodology according to an embodiment of the invention. Network monitoring methodology 200 is an example of a methodology for dynamic provisioning of network monitoring that can be implemented in the information processing system 100 of FIG. 1. Thus, reference will be made in steps of methodology 200 to elements in system 100. However, it is to be appreciated that embodiments of the invention are not limited to implementation in a system such as that illustratively shown in FIG. 1.

In step 202, a security administrator, or some other individual or system, initiates a request with the network monitoring controller 120 to provision a network monitoring service on one or more VMs specified with network addresses that may include, but are not limited to, Internet Protocol (IP) addresses and Ethernet Media Access Control (MAC) addresses. Other identification implementations may include, but are not limited to, VM name, VM ID, etc. The network monitoring controller 120 is configured to map the label to a VM. In the example depicted in FIG. 1, assume that VM 104-1 is the object of monitoring (i.e., monitoring subject or target). The request can be made through an interface associated with the network monitoring controller (examples of which are described above).

Based on the request, in step 204, the network monitoring controller 120 configures a traffic capture appliance to perform traffic capturing, modeling and reassembling functionality via a traffic capture interface associated with the traffic capture appliance. As illustratively used herein, "capturing" refers to ingesting or accepting network traffic for processing, and may include set up of filters and/or rules about what kind of network packets to capture (e.g., rule/filter to capture only packets from a certain IP address). Further, "modeling" refers to the situation where the appliance is driven by a model of the network traffic that specifies the aspects used for analysis. Aspects of the traffic outside the model are generally not usable for analytics and the traffic data that represents such aspects may be discarded by the appliance. Modeling may also be considered a process for parsing network packets that are in an expected format. Still further, "reassembling" refers to an operation associated with a higher level protocol session. For example, data for a Transmission Control Protocol (TCP) session may be spread across multiple captured packets that may not be in strict sequential order and may have intervening packets from other sessions in the traffic capture stream. The appliance reassembles the TCP session (headers and data transferred by TCP) from the packets that make up the session.

The traffic capture appliance can be on-demand provisioned or selected from a list of already-deployed traffic capture appliances. In FIG. 1, examples of on-demand provisioned/already-deployed traffic capture appliances are traffic capture components 116-1, 116-2, . . . , 116-N. In this specific example, traffic capture component 116-2 is the traffic capture appliance that will be used by the network monitoring controller 120.

In step 206, the network monitoring controller 120 queries the network (SDN) controller 110 to locate the corresponding virtual switch and logical ports for the specified VM, and then requests the network controller 110 to set up a traffic mirroring rule(s) on the located logical ports and configure a network tunnel to the traffic capture appliance specified in step 204.

Based on the request, in step 208, the network controller 110 configures the involved virtual switches (in this example, virtual switch 106 and virtual switch 112) to set up necessary network flow rules. Taking NVP/OVS as an example, the traffic mirroring rule is configured on OVS by NVP to mirror all traffic of the specified logical port and a GRE tunnel is configured to transfer the mirrored traffic (i.e., the mirrored traffic is a copy of the original traffic) to the appropriate traffic capture appliance. This is illustrated in FIG. 1 as can be seen by original traffic entering virtual switch 106 and the switch outputting the original traffic and mirrored traffic (the latter being encapsulated via the GRE tunnel).

For the purpose of this example, assume that the monitored VM 104-1 initiates an Internet Small Computer System Interface (iSCSI) request. It is to be appreciated that iSCSI traffic is used here for clarity of example, however, embodiments of the invention apply to any type or form of network traffic and/or protocol.

With reference now to step 210, in the virtual switch (106) within the hypervisor that hosts the monitored VM (104-1), the VM's iSCSI traffic is mirrored to a GRE port, where it is encapsulated and sent to the virtual switch 112 for the traffic capture appliance 116-2 through a GRE tunnel. The use of GRE is specific to NVP/OVS, however, other embodiments of the invention may use different encapsulation and tunneling techniques.

The virtual switch 106 within the hypervisor that hosts the monitored VM 104-1 continues to forward the iSCSI traffic towards the storage system 122 as usual, in step 212.

In step 214, the virtual switch 112 that receives the GRE-encapsulated traffic from the GRE tunnel removes the GRE encapsulation and dispatches the original iSCSI traffic to the logical port connected to the traffic capture appliance 116-2.

The traffic capture appliance 116-2, in step 216, captures and parses the traffic, storing the results for further use based on the configuration and capability of the traffic capture appliance, e.g., the appliance may be configured with a capture filter that only captures traffic of a specified protocol (e.g., Telnet/FTP/POP), and may be able to capture traffic at a given maximum traffic rate.

In step 218, the captured traffic is sent to the process and analysis module 118 where it can be consumed by various known tools to perform further processing and analytics. One example of such processing and analytics that module 118 performs is processing and analytics performed by RSA® Security Analytics software which may include, but is not limited to, security monitoring, incident investigation, malware analytics, and compliance reporting operations.

The improved network monitoring techniques described herein leverage network virtualization capability to remove limitations imposed by physical-attach requirements of existing network monitoring solutions. By virtualizing the network monitoring capability, the improved network monitoring techniques can better adapt to dynamic network topology and variable monitoring requirements. Furthermore, by leveraging traffic mirroring features, software-based network monitoring obtains improved configurability and flexibility. The network monitoring service according to embodiments described herein integrates closely with virtualization platforms to obtain full network coverage that enables capture of all traffic streams.

Figure 3:
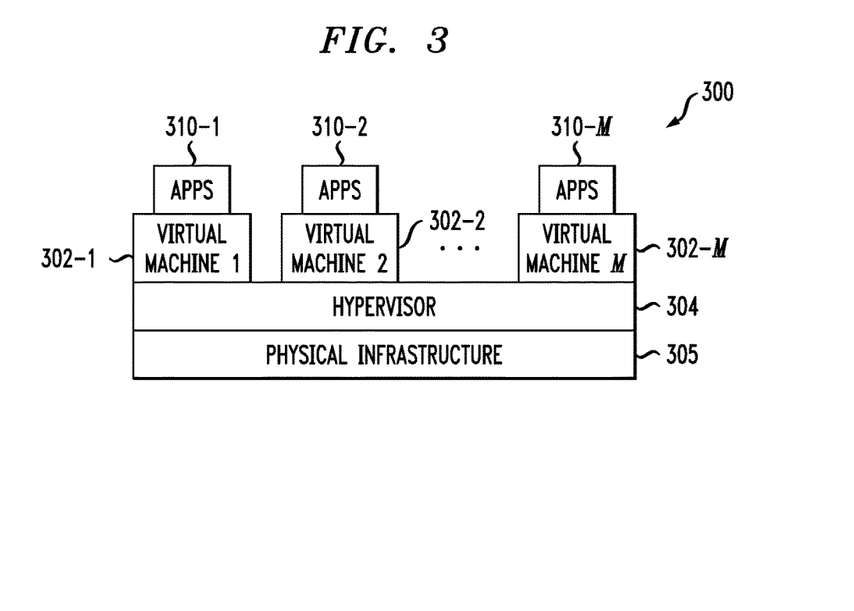
FIG. 3 shows a cloud infrastructure utilized to implement an information processing system according to one or more embodiments of the invention.

It is to be appreciated that the various elements and steps illustrated and described in FIGS. 1 and 2 can be implemented in a distributed virtual infrastructure or cloud infrastructure. FIG. 3 illustrates a cloud infrastructure 300. The virtualized information processing system 100 of FIG. 1 can be implemented, in whole or in part, by the cloud infrastructure 300.

As shown, the cloud infrastructure 300 comprises VMs 302-1, 302-2, . . . , 302-M implemented using a hypervisor 304. The hypervisor 304 runs on physical infrastructure 305. The cloud infrastructure 300 further comprises sets of applications 310-1, 310-2, . . . , 310-M running on respective ones of the VMs 302-1, 302-2, . . . , 302-M (utilizing associated logical storage units or LUNs) under the control of the hypervisor 304.

Although only a single hypervisor 304 is shown in the example of FIG. 3, a given embodiment of cloud infrastructure configured in accordance with an embodiment of the invention may include multiple hypervisors, each running on its own physical infrastructure. An example of a commercially available hypervisor platform that may be used to implement portions of the cloud infrastructure 300 in one or more embodiments of the invention is vSphere® which may include an associated virtual infrastructure management system such as vCenter®, commercially available from VMware Inc. (Palo Alto, Calif.). The underlying physical infrastructure 305 may comprise one or more distributed processing platforms that include storage products such as VNX® and Symmetrix VMAX®, both commercially available from EMC Corporation (Hopkinton, Mass.). A variety of other storage products may be utilized to implement at least a portion of the cloud infrastructure 300.

Figure 4:
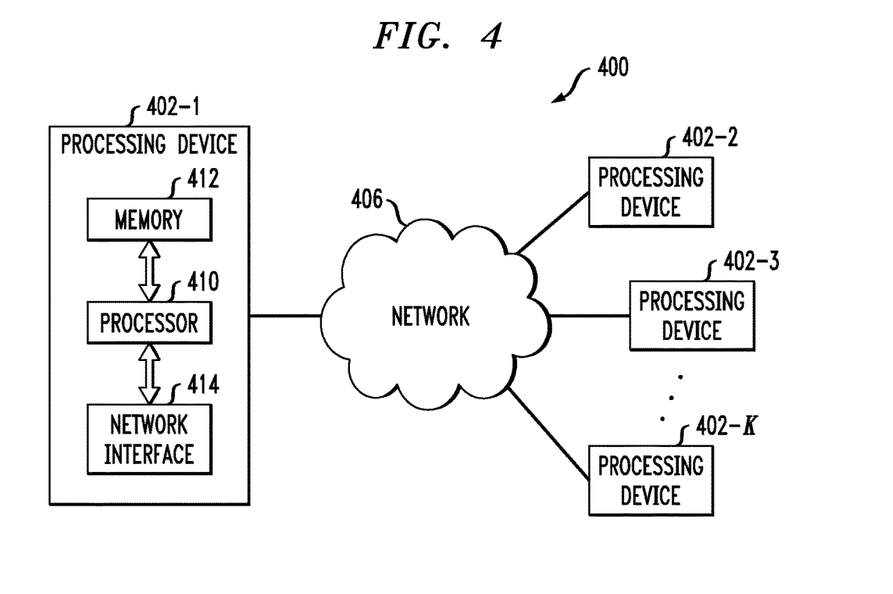
FIG. 4 shows a processing platform utilized to implement an information processing system according to one or more embodiments of the invention.

An example of a processing platform on which the cloud infrastructure 300 may be implemented is processing platform 400 shown in FIG. 4. The processing platform 400 in this embodiment comprises a plurality of processing devices denoted 402-1, 402-2, 402-3, . . . , 402-K which communicate with one another over a network 406. One or more of the elements shown and described in FIGS. 1 and 2 may therefore each run on one or more storage arrays, one or more hosts, servers, computers or other processing platform elements, each of which may be viewed as an example of what is more generally referred to herein as a "processing device." As illustrated in FIG. 4, such a device generally comprises at least one processor and an associated memory, and implements one or more functional modules for controlling certain features of components shown in FIGS. 1 and 2. Again, multiple elements or modules may be implemented by a single processing device in a given embodiment. That is, in one embodiment, all the elements shown in system 100 can be implemented by a single processing device 402; while in alternate embodiments, subsets of the elements shown in system 100 can be respectively implemented on multiple processing devices 402.

The processing device 402-1 in the processing platform 400 comprises a processor 410 coupled to a memory 412. The processor 410 may comprise a microprocessor, a microcontroller, an application-specific integrated circuit (ASIC), a field programmable gate array (FPGA) or other type of processing circuitry, as well as portions or combinations of such circuitry elements.

The memory 412 (or other storage devices) having program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals. Furthermore, memory 412 may comprise electronic memory such as random access memory (RAM), read-only memory (ROM) or other types of memory, in any combination. One or more software programs (program code) when executed by a processing device such as the processing device 402-1 causes the device to perform functions associated with one or more of the elements of system 100. One skilled in the art would be readily able to implement such software given the teachings provided herein. Other examples of processor-readable storage media embodying embodiments of the invention may include, for example, optical or magnetic disks.

Also included in the processing device 402-1 is network interface circuitry 414, which is used to interface the processing device with the network 406 and other system components. Such circuitry may comprise conventional transceivers of a type well known in the art.

The other processing devices 402 of the processing platform 400 are assumed to be configured in a manner similar to that shown for processing device 402-1 in the figure.

The processing platform 400 shown in FIG. 4 may comprise additional known components such as batch processing systems, parallel processing systems, physical machines, virtual machines, virtual switches, storage volumes, logical units, appliances, controllers, etc. Again, the particular processing platform shown in FIG. 4 is presented by way of example only, and elements and steps shown and described in FIGS. 1 and 2 may include additional or alternative processing platforms, as well as numerous distinct processing platforms in any combination.

Also, numerous other arrangements of servers, computers, storage devices or other components are possible for implementing components shown and described in FIGS. 1 and 2. Such components can communicate with other components over any type of network, such as a wide area network (WAN), a local area network (LAN), a satellite network, a telephone or cable network, a storage network (e.g., Fibre Channel, iSCSI, Ethernet), a converged network (e.g., FCoE or Infiniband) or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. For example, alternative embodiments are realized herein that utilize protocols other than GRE, iSCSI, and any other protocols and examples illustratively mentioned herein. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:

obtaining, at a monitoring controller, a request to provide a monitoring function for at least one subject virtual processing element in a virtualized information processing system;

one of selecting and provisioning, by the monitoring controller, at least one traffic capture appliance configured to capture traffic associated with the subject virtual processing element; and requesting, by the monitoring controller, the virtualized information processing system to forward a copy of traffic associated with the subject virtual processing element to the traffic capture appliance for analysis;

wherein requesting the virtualized information processing system to forward a copy of traffic associated with the subject virtual processing element comprises the monitoring controller querying a controller of the virtualized information processing system to locate a corresponding virtual switch and one or more logical ports for the subject virtual processing element, and further comprises the monitoring controller requesting the controller of the virtualized information processing system to set up traffic mirroring on the one or more logical ports and requesting the controller of the virtualized information processing system to configure an encapsulated tunnel from the corresponding virtual switch to the traffic capture appliance such that the traffic capture appliance captures and parses the copy of the traffic;

wherein the traffic mirroring and encapsulated tunnel are maintained when the subject virtual processing element is migrated from one physical host to another physical host; and wherein one or more of the steps are performed under control of at least one processing device.

2. The method of claim 1, wherein the analysis performed on the forwarded traffic captured by the traffic capture appliance comprises a security analysis.

3. An article of manufacture comprising a non-transitory processor-readable storage medium having encoded therein executable code of one or more software programs, wherein the one or more software programs when executed by the at least one processing device implement the steps of the method of claim 1.

4. The method of claim 1, wherein the traffic capture appliance parses the copy of the traffic and stores the parsed traffic for additional use based on a configuration of the traffic capture appliance.

5. The method of claim 4, wherein the traffic capture appliance is configured with a capture filter to capture traffic corresponding to at least one of a given protocol and a given maximum traffic rate.

6. The method of claim 1, wherein the monitoring controller configures the traffic capture appliance to perform traffic capturing via a traffic capture interface associated with the traffic capture appliance.

7. The method of claim 1, wherein the corresponding virtual switch continues to forward traffic associated with the subject virtual processing element to a storage system.

8. A method, comprising:

obtaining, at a monitoring controller, a request to provide a monitoring function for at least one subject virtual processing element in a virtualized information processing system;

one of selecting and provisioning, by the monitoring controller, at least one traffic capture appliance configured to capture traffic associated with the subject virtual processing element; and requesting, by the monitoring controller, the virtualized information processing system to forward a copy of traffic associated with the subject virtual processing element to the traffic capture appliance for analysis;

wherein requesting the virtualized information processing system to forward a copy of traffic associated with the subject virtual processing element comprises the monitoring controller querying a controller of the virtualized information processing system to locate a corresponding virtual switch and one or more logical ports for the subject virtual processing element, and further comprises the monitoring controller requesting the controller of the virtualized information processing system to set up traffic mirroring on the one or more logical ports and requesting the controller of the virtualized information processing system to configure an encapsulated tunnel from the corresponding virtual switch to the traffic capture appliance such that the traffic capture appliance captures and parses the copy of the traffic;

wherein the traffic mirroring and encapsulated tunnel are maintained when the subject virtual processing element is migrated from one physical host to another physical host;

wherein one or more of the steps are performed under control of at least one processing device; and wherein at least one of:

the virtual processing element comprises a virtual machine;

the traffic capture appliance is implemented by a virtual machine; and the virtualized information processing system comprises a software defined network (SDN) enabled data center.

9. The method of claim 8, wherein the traffic capture appliance parses the copy of the traffic and stores the parsed traffic for additional use based on a configuration of the traffic capture appliance.

10. The method of claim 9, wherein the traffic capture appliance is configured with a capture filter to capture traffic corresponding to at least one of a given protocol and a given maximum traffic rate.

11. The method of claim 8, wherein the analysis performed on the forwarded traffic captured by the traffic capture appliance comprises a security analysis.

12. The method of claim 8, wherein the monitoring controller configures the traffic capture appliance to perform traffic capturing via a traffic capture interface associated with the traffic capture appliance.

13. The method of claim 8, wherein the corresponding virtual switch continues to forward traffic associated with the subject virtual processing element to a storage system.

14. An apparatus, comprising:

a memory; and at least one of a processor operatively coupled to the memory to form a monitoring controller configured to:

obtain a request to provide a monitoring function for at least one subject virtual processing element in a virtualized information processing system;

one of select and provision at least one traffic capture appliance configured to capture traffic associated with the subject virtual processing element; and
request the virtualized information processing system to forward a copy of traffic associated with the subject virtual processing element to the traffic capture appliance for analysis;
wherein the request of the virtualized information processing system to forward a copy of traffic associated with the subject virtual processing element to the traffic capture appliance for analysis comprises the monitoring controller being configured to query a controller of the virtualized information processing system to locate a corresponding virtual switch and one or more logical ports for the subject virtual processing element, and further comprises the monitoring controller requesting the system controller of the virtualized information processing system to set up traffic mirroring on the one or more logical ports and request the controller of the virtualized information processing system to configure an encapsulated tunnel from the corresponding virtual switch to the traffic capture appliance such that the traffic capture appliance captures and parses the copy of the traffic; and wherein the traffic mirroring and encapsulated tunnel are maintained when the subject virtual processing element is migrated from one physical host to another physical host.

15. The apparatus of claim 14, wherein the at least one processor instantiates at least one virtual machine which is configured to perform the obtaining, selecting, provisioning, and requesting operations.

16. An apparatus, comprising:
a memory; and
at least one processor operatively coupled to the memory to form a monitoring controller configured to:
  obtain a request to provide a monitoring function for at least one subject virtual processing element in a virtualized information processing system;
  one of select and provision at least one traffic capture appliance configured to capture traffic associated with the subject virtual processing element; and
  request the virtualized information processing system to forward a copy of traffic associated with the subject virtual processing element to the traffic capture appliance for analysis, wherein the request of the virtualized information processing system to forward a copy of traffic associated with the subject virtual processing element to the traffic capture appliance for analysis comprises the monitoring controller being configured to query a controller of the virtualized information processing system to locate a corresponding virtual switch and one or more logical ports for the subject virtual processing element, and further comprises the monitoring controller requesting the controller of the virtualized information processing system to set up traffic mirroring on the one or more logical ports and request the controller of the virtualized information processing system to configure an encapsulated tunnel from the corresponding virtual switch to the traffic capture appliance such that the traffic capture appliance captures and parses the copy of the traffic; wherein the traffic mirroring and encapsulated tunnel are maintained when the subject virtual processing element is migrated from one physical host to another physical host;
wherein at least one of:
  the subject virtual processing element comprises a virtual machine;
  the traffic capture appliance is implemented by a virtual machine; and
  the virtualized information processing system comprises a software defined network (SDN) enabled data center.

17. The apparatus of claim 16, wherein the traffic capture appliance parses the copy of the traffic and stores the parsed traffic for additional use based on a configuration of the traffic capture appliance.

18. The apparatus of claim 17, wherein the traffic capture appliance is configured with a capture filter to capture traffic corresponding to at least one of a given protocol and a given maximum traffic rate.

19. A system, comprising:
one or more virtual machines;
a monitoring controller configured to:
  obtain a request to provide a monitoring function for a subject one of the one or more the virtual machines;
  one of select and provision at least one traffic capture appliance configured to capture traffic associated with the subject virtual machine;
a system controller configured to receive a request from the monitoring controller to set up traffic mirroring and an encapsulation tunnel at one or more logical ports of a virtual switch that corresponds to the subject virtual machine so as to forward a copy of traffic associated with the subject virtual machine to the traffic capture appliance, wherein the request of the virtualized information processing system to forward a copy of traffic associated with the subject virtual processing element to the traffic capture appliance comprises the monitoring controller being configured to query a controller of the subject virtual machine to locate a corresponding virtual switch and one or more logical ports for the subject virtual machine, and further comprises the monitoring controller requesting the controller of the subject virtual machine to set up traffic mirroring on the one or more logical ports and request the controller of the subject virtual machine to configure an encapsulated tunnel from the corresponding virtual switch to the traffic capture appliance such that the traffic capture appliance captures and parses the copy of the traffic;
an analyzer configured to receive the forwarded traffic from the traffic capture appliance and perform a security analysis on the forwarded traffic;
wherein the traffic mirroring and encapsulated tunnel are maintained when the subject virtual processing element is migrated from one physical host to another physical host; and
wherein the system is implemented in accordance with at least one processing device.

20. The system of claim 19, wherein the corresponding virtual switch continues to forward traffic associated with the subject virtual processing element to a storage system.

* * * * *